United States Patent
Cho et al.

(10) Patent No.: US 8,718,570 B2
(45) Date of Patent: May 6, 2014

(54) METHOD FOR TRANSMITTING AND UPDATING SYSTEM INFORMATION IN A LEGACY SUPPORT SYSTEM

(75) Inventors: Hee Jeong Cho, Anyang-si (KR); Ki Seon Ryu, Seongnam-si (KR)

(73) Assignee: LG Electronics Inc., Seoul (KR)

( * ) Notice: Subject to any disclaimer, the term of this patent is extended or adjusted under 35 U.S.C. 154(b) by 347 days.

(21) Appl. No.: 12/920,586

(22) PCT Filed: Apr. 6, 2009

(86) PCT No.: PCT/KR2009/001756
§ 371 (c)(1),
(2), (4) Date: Sep. 1, 2010

(87) PCT Pub. No.: WO2009/123425
PCT Pub. Date: Oct. 8, 2009

(65) Prior Publication Data
US 2011/0014877 A1    Jan. 20, 2011

Related U.S. Application Data

(60) Provisional application No. 61/042,272, filed on Apr. 4, 2008.

(30) Foreign Application Priority Data

May 1, 2008    (KR) ................ 10-2008-0041035

(51) Int. Cl.
*H04B 17/00*    (2006.01)
(52) U.S. Cl.
USPC .............. 455/70; 455/69; 455/59; 370/329; 370/330; 370/468; 375/260
(58) Field of Classification Search
CPC ... H04W 24/02; H04W 48/08; H04W 72/042; H04W 72/04; H04W 88/10
See application file for complete search history.

(56) References Cited

U.S. PATENT DOCUMENTS

| | | |
|---|---|---|
| 5,953,320 A | 9/1999 | Williamson et al. |
| 6,201,969 B1 | 3/2001 | Meier |
| 7,155,223 B2 | 12/2006 | O'Brien |
| 7,693,520 B2 | 4/2010 | Kang et al. |
| 7,702,289 B2 | 4/2010 | Tzavidas et al. |
| 2007/0037576 A1 | 2/2007 | Subramanian et al. |
| 2007/0058523 A1 | 3/2007 | Cho et al. |
| 2009/0005052 A1 | 1/2009 | Abusch-Magder et al. |
| 2009/0067377 A1* | 3/2009 | Talukdar et al. .............. 370/329 |
| 2009/0149179 A1 | 6/2009 | Shim et al. |
| 2010/0046464 A1* | 2/2010 | Kwak et al. ................... 370/330 |
| 2010/0278123 A1* | 11/2010 | Fong et al. .................... 370/329 |
| 2011/0019622 A1* | 1/2011 | Lee et al. ...................... 370/328 |

FOREIGN PATENT DOCUMENTS

| | | |
|---|---|---|
| KR | 10-0790139 | 1/2008 |
| WO | 2007-024110 | 3/2007 |

* cited by examiner

*Primary Examiner* — Fayyaz Alam
*Assistant Examiner* — Mohammed Rachedine
(74) *Attorney, Agent, or Firm* — Lee, Hong, Degerman, Kang & Waimey

(57) ABSTRACT

A method for transmitting and updating system information in a system that supports a legacy mobile station is disclosed. A method for transmitting system information according to one embodiment of the present invention comprises transmitting a super-map through a new zone of a super-frame, the super-map including channel description transmission control information indicating a channel descriptor of a legacy zone; and transmitting the channel descriptor and a map message through the legacy zone, the map message indicating the channel descriptor.

12 Claims, 8 Drawing Sheets

METHOD FOR TRANSMITTING AND UPDATING SYSTEM INFORMATION IN A LEGACY SUPPORT SYSTEM

CROSS-REFERENCE TO RELATED APPLICATIONS

This application is the National Stage filing under 35 U.S.C. 371 of International Application No. PCT/KR2009/001756 filed on Apr. 6, 2009, which claims the benefit of earlier filing date and right of priority to Korean Patent Application No. 10-2008-0041035 filed on May 1, 2008 and also claims the benefit of U.S. Provisional Application Ser. No. 61/042,272 filed on Apr. 4, 2008, the contents of which are all hereby incorporated by reference herein in their entirety.

TECHNICAL FIELD

The present invention relates to a wireless access system, and more particularly to, a method for efficiently updating system information in a new mobile station when a base station supports a legacy mobile station in a wireless access system.

BACKGROUND ART

FIG. 1A is a diagram illustrating an update procedure of an uplink channel descriptor (UCD) according to the related art.

It is assumed that UL-MAP is transmitted per frame in a state that a frame duration period is 20 ms, and a UCD transmission interval is 10 s. Also, a mobile station has already received UCD of which configuration change count is "i". A base station transmits UL-MAP, of which a UCD count is "i," per 20 ms (S101, S102). The base station retransmits the UCD message, of which the configuration change count is "i," at the time when the UCD message will be transmitted (S103). The mobile station which has received the UCD message decodes the corresponding message and then compares a configuration change count included in its own UCD with the configuration change count of the newly received UCD. If the configuration change counts are identical with each other, the mobile station ignores system information included in the newly received message (S104). The base station continues to transmit UL-MAP, of which the UCD count is "i," per 20 ms (S105). If the system information has been changed (S106), the base station transmits a configuration change count "i+1" and the changed UCD message at a corresponding transmission time (S107). The mobile station decodes the corresponding message and then compares the configuration change count included in its own UCD with that of the newly received UCD. If the configuration change counts are different from each other, the mobile station stores the system information of the newly received message (S108). The base station continues to transmit UL-MAP, of which the UCD count is "i," per 20 ms (S109, S110). The base station retransmits the previously transmitted UCD message at the corresponding transmission time and starts a UCD transition interval timer (S111). If the timer expires, the base station transmits UL-MAP of which a UCD count is "i+1" (S112). The mobile station which has received the UL-MAP deletes the existing UCD system information and applies new UCD system information (S113). The above steps are similarly performed for a downlink channel descriptor (DCD) message.

As described above, the base station transmits system information per long interval as one message. In this case, the mobile stations decode the message every time to identify whether system information has been updated, and may store and update system information which does not need to update. Also, for application of the changed system information, the mobile station may need much time.

FIG. 1B is a diagram illustrating relations of a super-frame, a frame, a subframe, and OFDM symbols of the IEEE 802.16m system.

In an example of FIG. 1B, one super-frame has a length of 20 ms, and four frames each having a length of 5 ms are provided. A super-frame header exists at the starting position of the super-frame. The super-frame header includes super-frame header system information and broadcasting messages. The super-frame header can include a structure of several symbols, or several subframes. One frame of 5 ms includes eight subframes, each having six OFDMA symbols.

FIG. 2 is a diagram illustrating scheduling of system information of each of a legacy mobile station and a new mobile station.

In this case, an optimized system information transmission mode can be used to fulfill requirements (for example, TGm SRD-IEEE 802.16m-07/002r4) of a new system. However, since system information is transmitted through both a legacy zone and a new zone, a waste of radio resources may be caused.

It is to be understood that the technical problems to be achieved by the present invention are not limited to the aforementioned technical problems, and any other technical problems which are not described will be apparent from the detailed description of the present invention to those skilled in the art to which the present invention pertains.

DISCLOSURE OF THE INVENTION

Accordingly, the present invention is directed to a method for transmitting and updating system information in a legacy support system, which substantially obviates one or more problems due to limitations and disadvantages of the related art.

An object of the present invention is to provide a method for transmitting system information, in which a new mobile station can efficiently receive system information transmitted through a legacy zone.

Another object of the present invention is to provide a method for updating system information, in which a new mobile station can receive and update system information transmitted through a legacy zone to more efficiently use limited radio resources.

In order to achieve the first object, a method for transmitting system information according to one embodiment of the present invention comprises transmitting a super-map through a new zone of a super-frame, the super-map including channel description transmission control information indicating a channel descriptor of a legacy zone, and transmitting the channel descriptor and a map message through the legacy zone, the map message indicating the channel descriptor, wherein the channel description transmission control information includes at least one of a configuration change count and a change bit which indicates whether the channel descriptor has been changed.

Preferably, the channel description transmission control information includes a field for at least one of a starting sub-frame in which the channel descriptor is transmitted, a starting radio block, and a number of radio blocks allocated to the channel descriptor.

Preferably, the channel description transmission control information includes separate fields indicating a DCD message and a UCD message included in the legacy zone, respectively.

Preferably, the channel description transmission control information includes a field indicating a repetition coding scheme or a coding scheme of the DCD message and the UCD message included in the legacy zone.

In order to achieve the second object, a method for updating system information according to one embodiment of the present invention comprises receiving channel description transmission control information through a super-map included in a new zone of a super-frame, the channel description transmission control information including a configuration change count indicating whether a channel descriptor of a legacy zone has been changed, and decoding the channel descriptor in the legacy zone, if the configuration change count indicates that the channel descriptor has been changed.

Preferably, the method further comprises applying the channel descriptor to system information of the new mobile station, if at least one of a UCD count or a DCD count is received through a map message of the legacy zone or the new zone.

Preferably, the method further comprises applying the channel descriptor to system information of the new mobile station if at least one of a UCD count and/or a DCD count the same as the configuration change count through a map message of the new zone.

Preferably, the channel description transmission control information includes a field for at least one of a starting sub-frame within which the channel descriptor is transmitted, a starting radio block, and a number of radio blocks allocated to the channel descriptor.

Preferably, the channel description transmission control information includes a field indicating a repetition coding scheme or a coding scheme of the DCD message and the UCD message of the legacy zone.

In order to achieve the second object, a method for updating system information according to another embodiment of the present invention comprises receiving channel description transmission control information through a super-map included in a new zone of a super-frame, the channel description transmission control information including a change bit indicating in a toggle mode whether a channel descriptor of a legacy zone has been changed, and decoding the channel descriptor in the legacy zone, if the change bit indicates that the channel descriptor has been changed.

Preferably, the channel description transmission control information includes a field for at least one of a starting sub-frame within which the channel descriptor is transmitted, a starting radio block, and a number of radio blocks allocated to the channel descriptor.

Preferably, the channel description transmission control information includes a field indicating a repetition coding scheme or a coding scheme of the DCD message and the UCD message of the legacy zone.

According to the embodiments of the present invention, since the base station transmits channel description transmission control information to the mobile station, the new mobile station does not need to decode system information every time. Accordingly, since the mobile station decodes and updates the changed system information only, a waste of radio resources can be avoided, and the update time of the system information can be reduced.

It is to be understood that the advantages according to the present invention are not limited to the aforementioned advantages, and any other advantages which are not described will be apparent from the detailed description of the present invention to those skilled in the art to which the present invention pertains.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Hereinafter, the preferred embodiments of the present invention will be described with reference to the accompanying drawings. However, it is to be understood that various modifications can be made in the following embodiments of the present invention and the scope of the present invention is not limited to the following embodiments.

To more efficiently use limited radio resources, the embodiments of the present invention provide channel description transmission control information that can allow a new mobile station to efficiently receive and update system information transmitted through a legacy zone. In the present invention, "legacy" is a relative terminology. For example, if a new mobile station is a mobile station that supports IEEE 802.16m, a legacy mobile station could be a mobile station discussed in a technical standard of old version, like IEEE 802.16e.

A base station transmits system information to the mobile station through a legacy zone, and transmits control information, which is required for a new mobile station to receive the system information, through a new zone. The new mobile station is informed through the control information whether system information has been changed, and decodes and updates the system information accordingly.

Figure 1A:
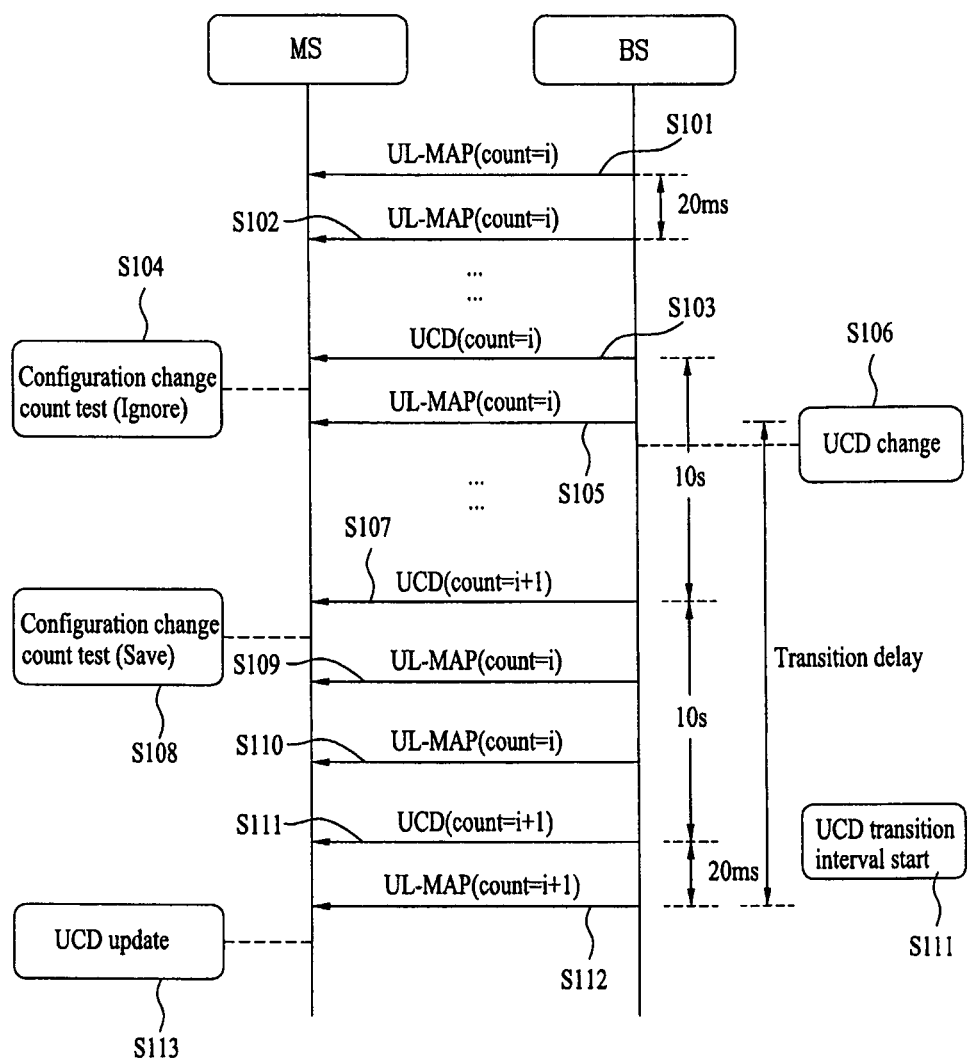
FIG. 1A is a diagram illustrating an update procedure of a UCD according to the related art.
Figure 1B:
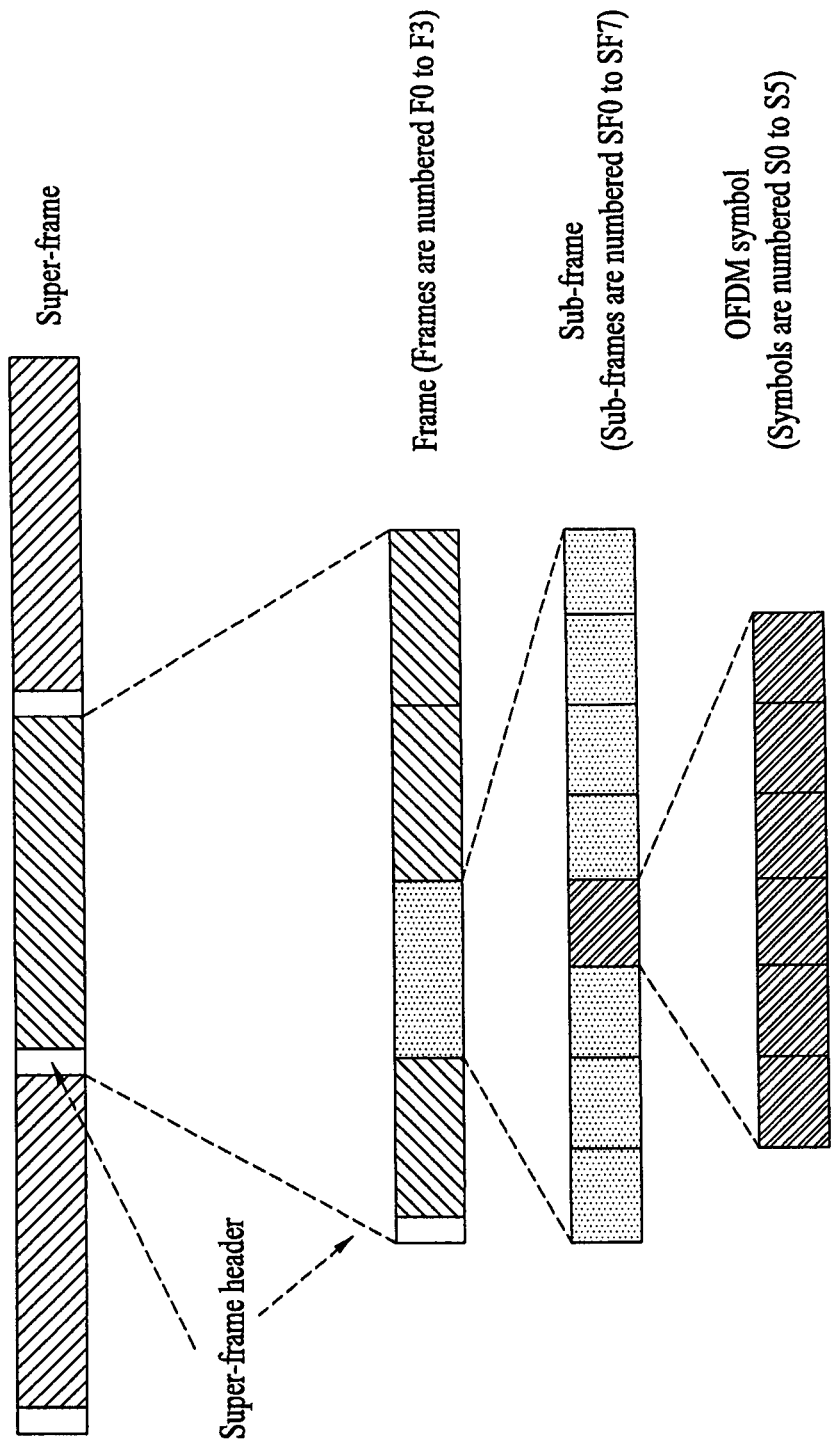
FIG. 1B is a diagram illustrating the relation among super-frame, frame, subframe, and OFDM symbols.
Figure 2:
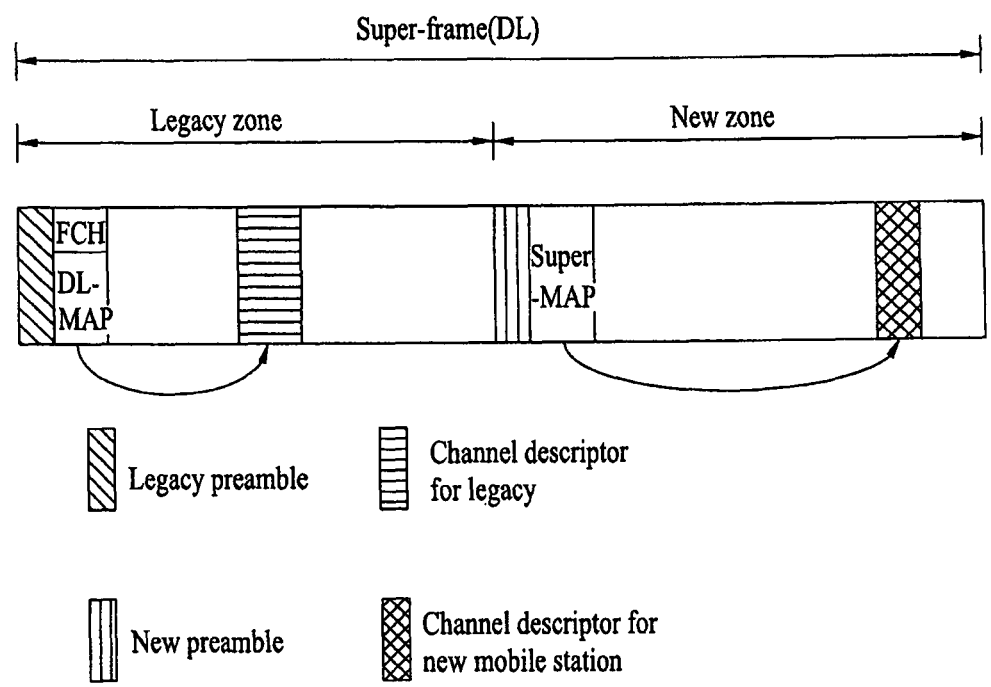
FIG. 2 is a diagram illustrating scheduling of system information of each of a legacy mobile station and a new mobile station.
Figure 3:
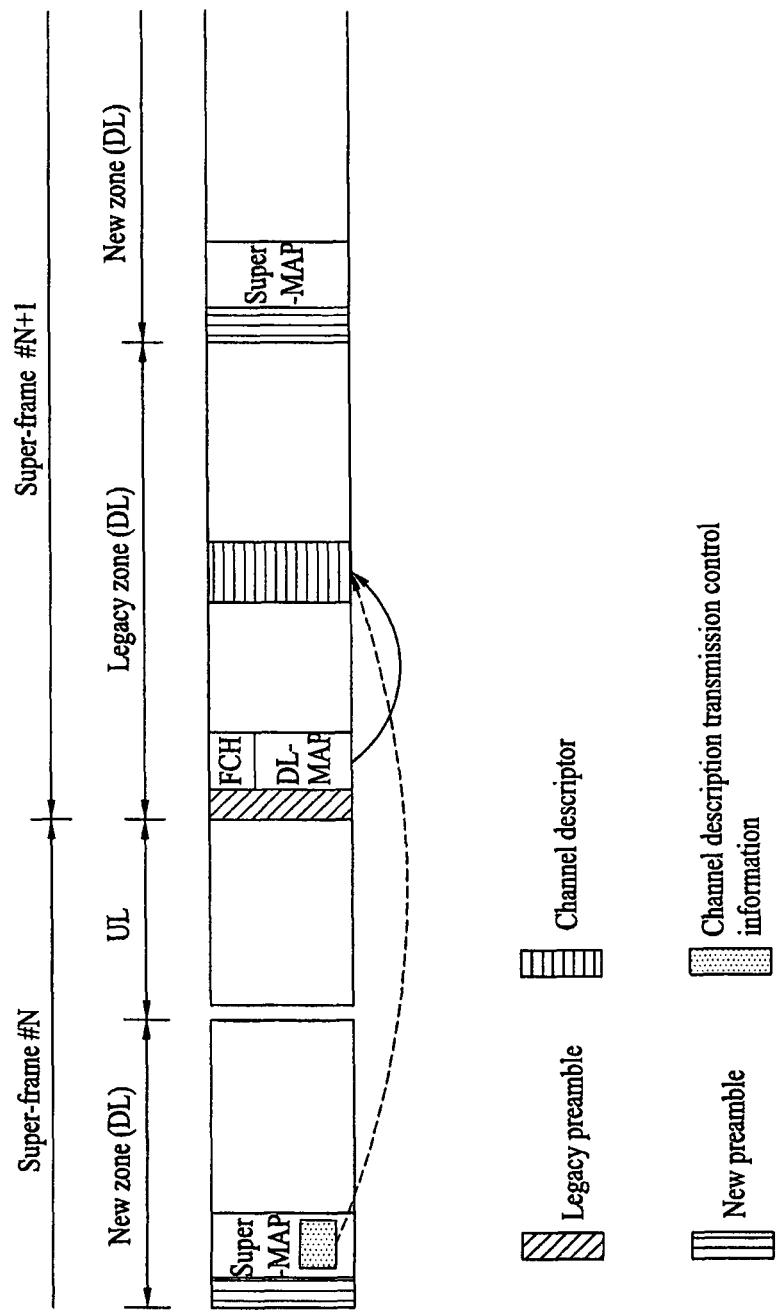
FIG. 3 is a diagram illustrating scheduling of system information according to one embodiment of the present invention.

FIG. 3 is a diagram illustrating scheduling of system information according to one embodiment of the present invention.

In FIG. 3, the channel description transmission control information transmitted from the base station indicates DCD/UCD messages in a legacy zone. In this embodiment, the channel description transmission control information is transmitted through a super-MAP that transfers control information of a new zone. The term of "super-MAP" can be replaced with another term like "super frame header," etc.

An example of the channel description transmission control information of the system information is as shown in Table 1. In Table 1, each field is included in accordance with a type, but each field can be included notwithstanding the type.

TABLE 1

| Grammar | Description |
| --- | --- |
| Type | 0001: DCD<br>0010: UCD<br>0011: DCD + UCD<br>Other: reserved |
| Repetition_Coding_Indication | 0b00 - No repetition coding<br>0b01 - Repetition coding of 2<br>0b10 - Repetition coding of 4<br>0b11 - Repetition coding of 6 |
| Coding_Indication | 0b000 - CC encoding<br>0b001 - BTC encoding<br>0b010 - CTC encoding<br>0b011 - ZT CC encoding<br>0b100 - LDPC encoding<br>0b101~0b111 - Reserved |
| If (Type == 0001 ‖ 0011) { | |
| Configuration Change Count | Configuration change count of message transmitted from next super-frame |
| Change Bit | Toggle key<br>If base station transmits message changed from next super-frame, this field is toggled. |
| Sub-frame Offset | Start Sub-frame to which message is transmitted from super-frame |
| Radio_block Offset | Start Radio-block to which message is transmitted |
| Radio_block Number | The number of radio-blocks allocated to message |
| }<br>Else If (Type == 0010 ‖ 0011) {<br>Configuration Change Count<br>Change Bit<br>Sub-frame Offset<br>Radio_block Offset<br>Radio_block Number<br>} | |

The DCD and UCD messages are transmitted in accordance with the same modulation and coding schemes as those used when a downlink map (DL-MAP) is transmitted. Since information of a modulation scheme and a coding scheme used in a legacy DL-MAP is transmitted through a frame control header (FCH) of the legacy zone, the new mobile station can obtain information on the modulation and coding schemes by decoding the FCH. Also, if information such as repetition_coding_indication and coding_indication is included in the channel description transmission control information as illustrated in Table 1, the new mobile station does not need to decode the FCH. If the coding scheme of the DCD and UCD messages is fixed, the information of the modulation and coding schemes does not need to be transmitted through the channel description transmission control information.

The transmission positions of the DCD and UCD messages are transferred through the DL-MAP. Likewise, the new mobile station can decode the DL-MAP or use information such as Sub-frame Offset, Radio_block Offset, and Radio_block Number, so as to identify the transmission positions of the DCD and UCD messages, wherein the information such as Sub-frame Offset, Radio_block Offset, and Radio_block Number is transmitted through the channel description transmission control information.

Figure 4:
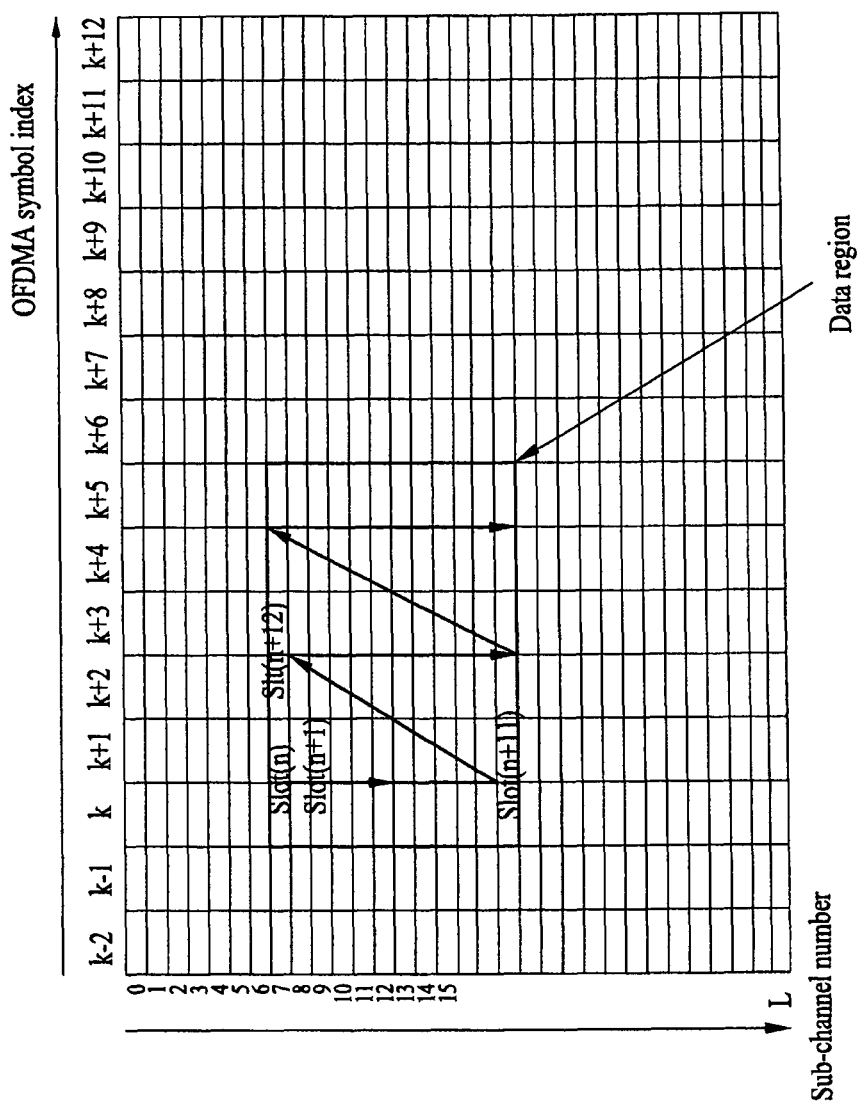
FIG. 4 is a diagram illustrating a mapping mode of DCD and UCD messages in a legacy zone.

FIG. 4 is a diagram illustrating a mapping mode of DCD and UCD messages in a legacy zone.

FIG. 4 illustrates an example of OFDMA slot mapping suggested in air interface for broadband wireles's access systems in accordance with the IEEE 802.16m draft standard. Since the DCD and UCD messages of the legacy zone are transmitted by being mapped in accordance with the mapping mode of FIG. 4 in a partial usage subchannel (PUSC) mode, the mobile station should decode these messages by considering the mapping mode.

The mobile station compares a configuration change count corresponding to the message transmitted through the channel description transmission control information with its own configuration change count. If the configuration change counts are different from each other, the mobile station decodes the corresponding message to be transmitted from next super-frame and then stores the message. Alternatively, the mobile station compares a change bit of the message transmitted through the channel description transmission control information with its own change bit. If the change bits are different from each other, the mobile station decodes the corresponding message to be transmitted from next super-frame and then stores the message. At this time, the mobile station can decode the corresponding message with reference to the DCD or UCD count. If the configuration change count of the transmitted message is identical with that stored in the mobile station or the change bit of the transmitted message is identical with that stored in the mobile station, the mobile station may not decode the corresponding message.

Figure 5:
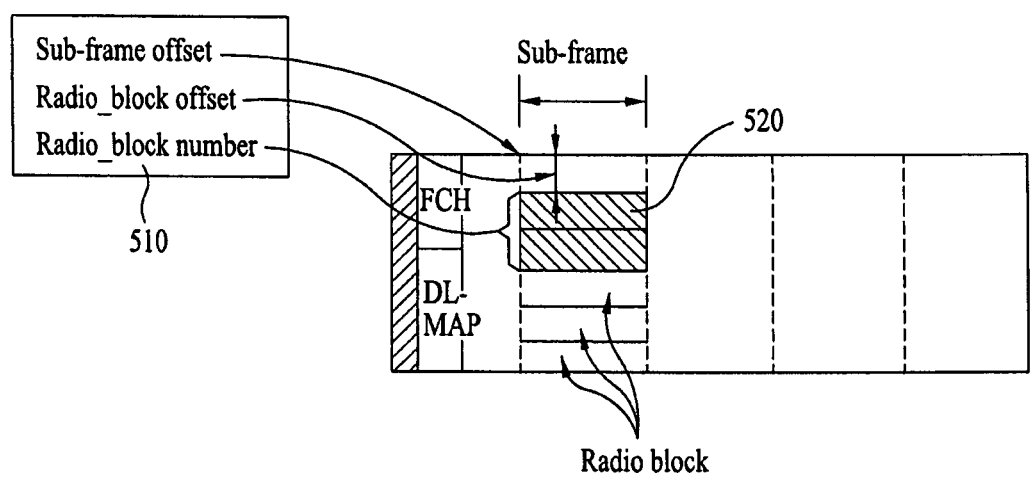
FIG. 5 is a diagram illustrating an example of a data region indicated by channel description transmission control information of FIG. 3.

FIG. 5 is a diagram illustrating an example of a data region 520 indicated by channel description transmission control information of FIG. 3.

FIG. 5 illustrates functions of Sub-frame Offset, Radio_block Offset, and Radio_block Number in channel description transmission control information 510. The Sub-frame Offset is a starting sub-frame through which a message will be transmitted. Here, the sub-frame is a physical structure unit, e.g. a frame unit. The Radio_block Offset means from what radio block in the starting sub-frame a message will start. Finally, the Radio_block Number means the number of radio blocks allocated for transmitting the message.

In this case, since a downlink of the IEEE 802.16e allocates resources in accordance with block allocation, a block allocation scheme is considered to determine an allocation region 520. The region 520 indicated by the channel description transmission control information 510 is determined, as illustrated in Equation 1 to Equation 3, by values of the Sub-frame Offset, Radio_block Offset, and Radio_block Number. Also, the Radio_block number always has an even value.

$$\text{Radio-block number} \leq RB_{useful}, RB_{used}(\text{Sub-frame Offset}, \text{Radio\_block Offset}, 1, \text{Radio\_block Number}) \quad \text{[Equation 1]}$$

$$\text{Radio-block number} > RB_{useful}, RB_{used}(\text{Sub-frame Offset}, \text{Radio\_block Offset}, \text{Radio\_block Number}/j, j) \quad \text{[Equation 2]}$$

If $\mod(\text{Radio\_block Number}, i) == 0, j = MAX(i)$ $$(2 \leq i \leq RB\_N_{useful}) \quad \text{[Equation 3]}$$

In this case, $RB\_N_{useful}$ means the number of available radio blocks per sub-frame, which is determined by Radio_block Offset.

$RB_{used}$ is determined in accordance with Sub-frame Offset, Radio_block Offset, the number of Sub-frames, and the number of radio blocks per Sub-frame.

Since transmission periods of the aforementioned DCD and UCD messages are relatively long, it is not preferable to include channel description transmission control information per super-map. Accordingly, a field or reserved code, which indicates whether channel description transmission control information is included therein, may be used.

Figure 6:
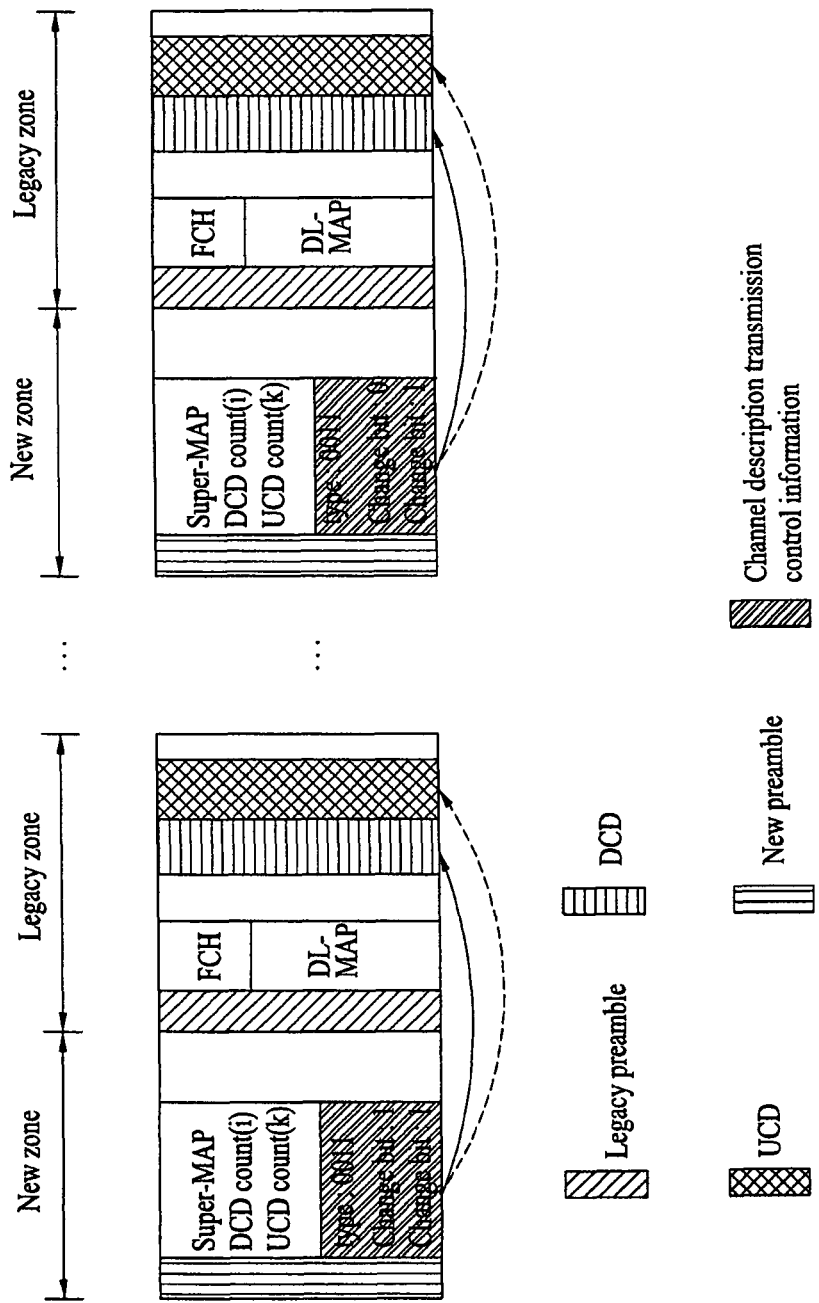
FIG. 6 is a diagram illustrating scheduling of system information according to another embodiment of the present invention.

FIG. 6 is a diagram illustrating scheduling of system information according to another embodiment of the present invention.

FIG. 6 relates to an embodiment in which a new mobile station is informed whether DCD and UCD messages have been changed. The mobile station can realize that the DCD and UCD messages are transmitted through a next legacy zone based on a type included in the channel description control information of the first new zone. Change bits of the DCD and UCD messages in the channel description control information are "1," respectively. The mobile station can also identify that the DCD and UCD messages are transmitted through next legacy zone based on a type in the channel description control information of the last new zone. The mobile station compares change bits of the DCD and UCD messages with change bits stored in the mobile station, respectively. Since the change bit of the DCD message has been changed in FIG. 6, the mobile station decodes the DCD message only. Although not illustrated in FIG. 6, as one example, a procedure for actual application of the changed information can be performed in accordance with the change of the count values included in either the DL-MAP message of the legacy zone or the super-frame header of the new zone.

Figure 7:
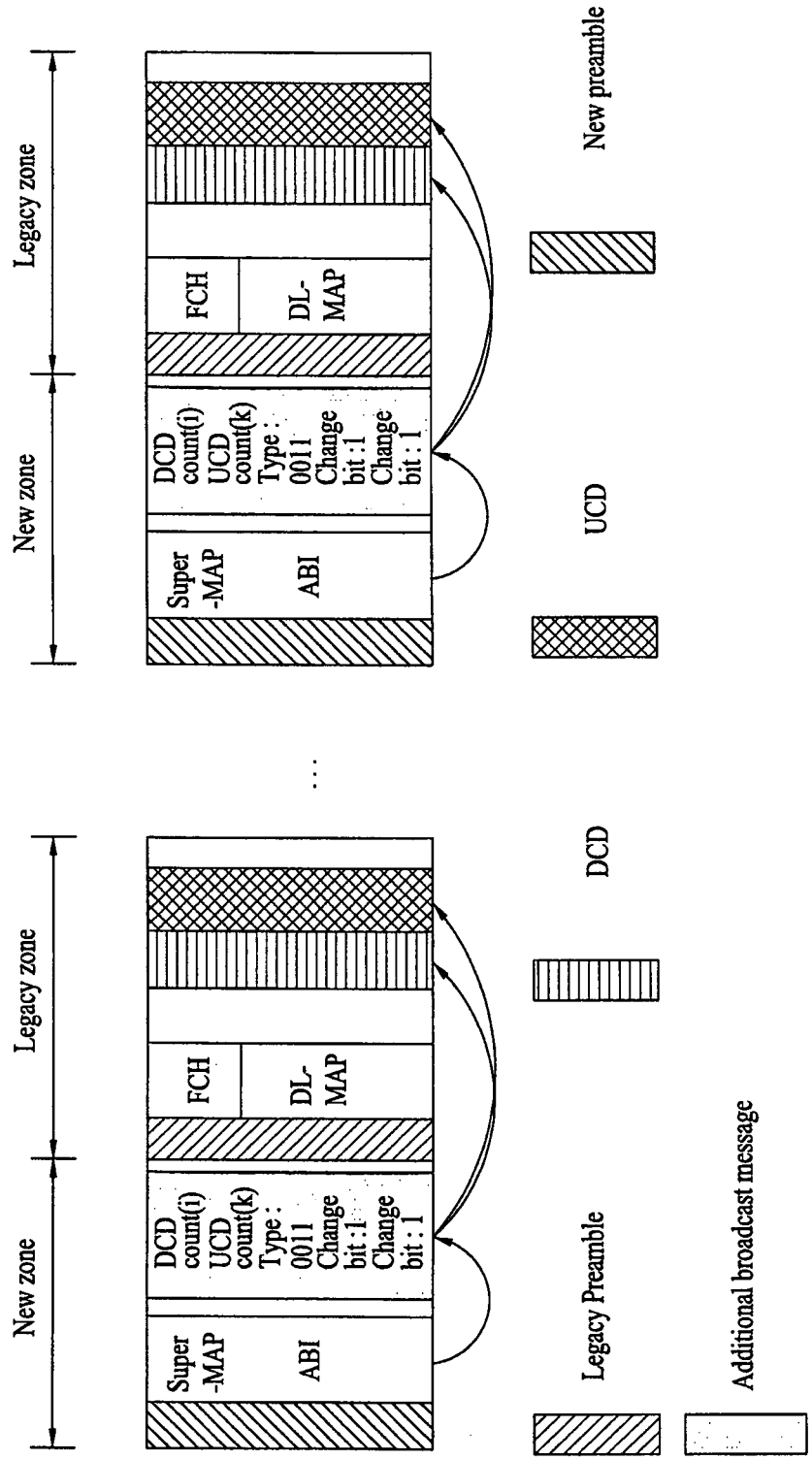
FIG. 7 is a diagram for explaining another embodiment in accordance with the present invention in which a new mobile station realizes whether DCD and UCD messages are changed or not.

FIG. 7 is a diagram for explaining another embodiment in accordance with the present invention in which a new mobile station realizes whether DCD and UCD messages are changed or not. In FIG. 7, information associated with an additional broadcast message is included in a super-MAP of a new zone. The information associated with the additional broadcast message may include an indicator (ABI: additional broadcast message indicator) indicating whether the additional broadcast message is included in the new zone. Further, the information associated with the additional broadcast message may include a type and transmission location of the additional broadcast message with or without the ABI.

The additional broadcast message includes information associated with the DCD/UCD messages transmitted through a legacy legion. The information associated with the DCD/UCD messages may include a DCD count value (DCD count (i)), a UCD count value (UCD count (k)), a DCD change bit, a UCD change bit, and information about location through which the DCD/UCD messages are transmitted. Both the DCD/UCD count values and the DCD/UCD change bits can be included in the information associated with the DCD/UCD messages. Alternatively, either the DCD/UCD count values or the DCD/UCD change bits can be included. The location information may include a radio block offset and the number of radio blocks.

The new mobile terminal realizes based on the information associated with the additional broadcast message whether the additional broadcast message is transmitted in the new zone. When the additional broadcast message is transmitted, the new mobile station obtains the information associated with the DCD/UCD messages included in the additional broadcast message. The new mobile terminal is informed based on the DCD/UCD count values and/or the DCD/UCD change bits whether the DCD/UCD messages have been changed. When the DCD/UCD messages have been changed, the new mobile station receives the DCD/UCD messages through the legacy zone.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention relates to a method for minimizing resource overhead and efficiently updating system information of a new mobile station when a base station supports a legacy mobile station in a wireless access system. The present invention can be applied to a base station, a mobile station, etc. in systems such as IEEE std 802.16-2004, IEEE std 802.16e-2005, and IEEE 802.16Rev2 in addition to IEEE 802.16m.

The invention claimed is:

1. A method for receiving a channel descriptor in a wireless access system supporting a legacy mobile station (MS) and an advanced MS having additional features than the legacy MS, the method performed by the advanced MS and comprising:
   receiving a super-map message through a new zone supporting the advanced MS in a super-frame, wherein the super-map message includes channel description transmission control information that includes change information indicating whether the channel descriptor has been changed, location information indicating a location of the channel descriptor, and coding scheme information for decoding the channel descriptor;
   receiving, through a legacy zone supporting the legacy MS and the advanced MS in the super-frame, the channel descriptor using the location information when the change information indicates that the channel descriptor has been changed; and
   decoding the channel descriptor using the coding scheme information.

2. The method of claim 1, wherein the location information includes:
   a sub-frame offset indicating a sub-frame in which the channel descriptor is located at the super-frame;
   a radio block offset indicating a radio block in which the channel descriptor is located at the sub-frame; and
   a radio block number indicating a number of radio blocks allocated to the channel descriptor.

3. The method of claim 1, wherein the super-frame includes:
the new zone including a positive integer number of consecutive subframes during which a base station communicates with the advanced MS; and
the legacy zone including a positive integer number of consecutive subframes during which the base station communicates with the legacy MS or the advanced MS.

4. The method of claim 1, wherein the change information includes at least a configuration change count and a change bit.

5. The method of claim 1, wherein the channel descriptor includes at least a downlink channel descriptor (DCD) message and an uplink channel descriptor (UCD) message.

6. The method of claim 5, wherein the channel description transmission control information further includes a type field indicating at least the DCD message and the UCD message.

7. A method for transmitting a channel descriptor by a base station in a wireless access system supporting a legacy mobile station (MS) and an advanced MS having additional features than the legacy MS, the method comprising:
transmitting a super-map message through a new zone supporting the advanced MS in a super-frame, wherein the super-map message includes channel description transmission control information which includes change information indicating whether the channel descriptor has been changed, location information indicating a location of the channel descriptor, and coding scheme information for decoding the channel descriptor;
transmitting, through a legacy zone supporting the legacy MS and the advanced MS in the super-frame, a frame control header (FCH) and a map message and the channel descriptor,
wherein the FCH includes the coding scheme information, and the map message includes the location information.

8. The method of claim 7, wherein the location information includes:
a sub-frame offset indicating a sub-frame in which the channel descriptor is located at the super-frame;
a radio block offset indicating a radio block in which the channel descriptor is located at the sub-frame; and
a radio block number indicating a number of radio blocks allocated to the channel descriptor.

9. The method of claim 7, wherein the super-frame includes:
the new zone including a positive integer number of consecutive subframes during which the base station communicates with the advanced MS; and
the legacy zone including a positive integer number of consecutive subframes during which the base station communicates with the legacy MS or the advanced MS.

10. The method of claim 7, wherein the change information includes at least a configuration change count and a change bit.

11. The method of claim 7, wherein the channel descriptor includes at least a downlink channel descriptor (DCD) message and an uplink channel descriptor (UCD) message.

12. The method of claim 11, wherein the channel description transmission control information further includes a type field indicating at least the DCD message and the UCD message.

* * * * *